United States Patent [19]

Maples

[11] 4,396,035
[45] Aug. 2, 1983

[54] BACK PRESSURE VALVE

[75] Inventor: John H. Maples, Houston, Tex.

[73] Assignee: Whiting Oilfield Rental, Inc., Houston, Tex.

[21] Appl. No.: 270,840

[22] Filed: Jun. 5, 1981

[51] Int. Cl.³ ............................................ F16K 15/04
[52] U.S. Cl. .................................................. 137/539
[58] Field of Search ..................... 137/539, 539.5, 540, 137/543.17

[56] References Cited

U.S. PATENT DOCUMENTS

| | | | |
|---|---|---|---|
| 1,305,964 | 6/1919 | Dickson | 137/539 |
| 1,659,047 | 2/1928 | Quinn | 137/539 |
| 1,931,938 | 10/1933 | Pippin | 137/539.5 |
| 2,128,352 | 8/1938 | Creighton . | |
| 2,293,259 | 8/1942 | Johnson . | |
| 2,322,139 | 6/1943 | Kaelin | 137/539.5 |
| 2,611,045 | 9/1952 | Wayman | 137/539 |
| 3,494,417 | 2/1970 | Fredd . | |
| 3,768,506 | 10/1973 | McGill . | |
| 3,799,278 | 3/1974 | Oliver . | |
| 3,802,521 | 4/1974 | Oliver . | |

FOREIGN PATENT DOCUMENTS

| | | | |
|---|---|---|---|
| 2528244 | 12/1976 | Fed. Rep. of Germany | 137/539 |
| 368413 | 3/1932 | United Kingdom | 137/539 |

OTHER PUBLICATIONS

Practical Drilling, vol. 1, Blowout Prevention, W. C. Goins, Jr., Gulf Publishing Company, Houston, TX.
Composite Catalog, published by World Oil, A Gulf Publishing Company, vol. 4, p. 5972.

Primary Examiner—Robert G. Nilson

[57] ABSTRACT

A back pressure valve includes a tubular body having pin and box connections at its outer ends and formed of two tubes connected by double step straight threaded connectors with a seat ring captured between the two tubes. A ball is urged against the seat ring by a helical compression spring. A triple slotted tubular spring support is screwed into the outlet portion of the body. A hex headed cylindrical post at the upper closed end of spring support fits snugly but slidably with the spring and centers the spring. The dimensions of the spring and spring support are such as to prevent the spring from buckling. The flow path through the slots and around the support is as large as that through the seat ring, which is about equal to that through the pin connectors of the body tubes, whereby the wall thickness of the pin connectors is large. The support can be removed with a socket wrench. A release tool can depress the ball off its seat to release fluid pressure.

9 Claims, 6 Drawing Figures

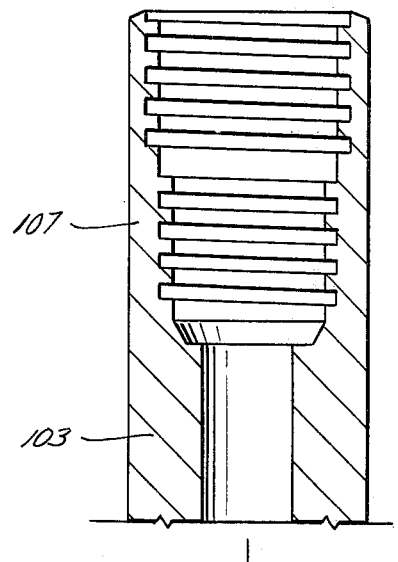
Fig. 2
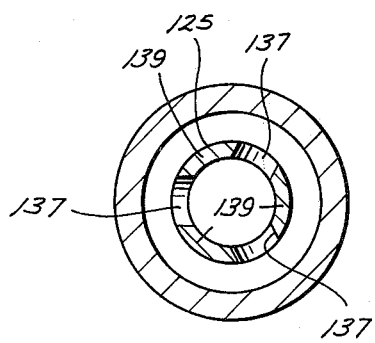
Fig. 2A
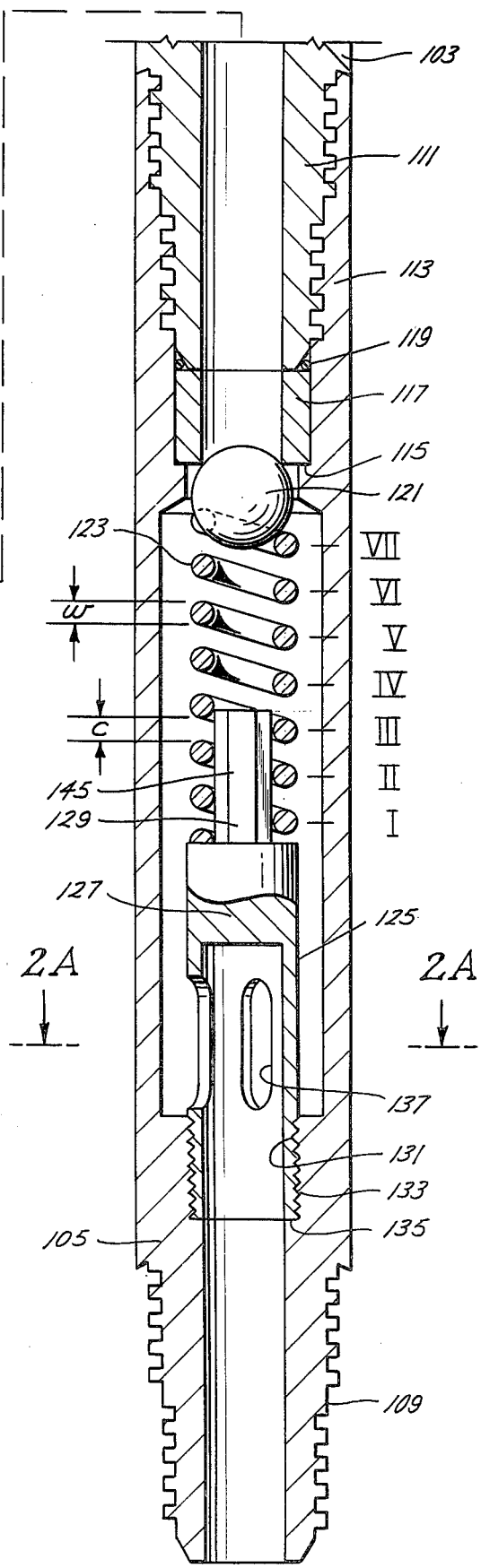

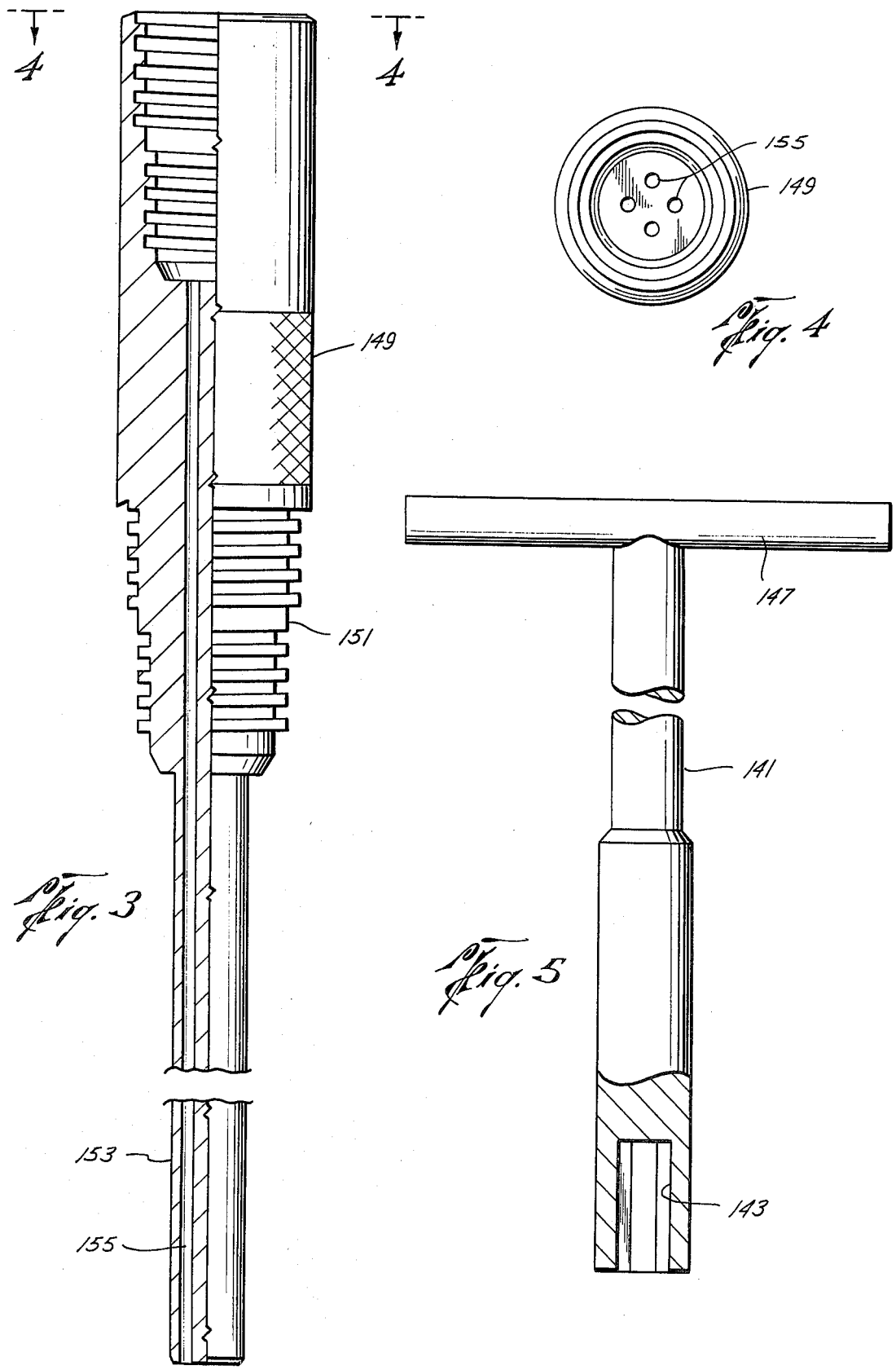

BACK PRESSURE VALVE

SUMMARY OF INVENTION (a) Field of Use

This invention pertains to valves and more particularly to spring loaded ball check valves adapted for use in oil-field tubulars to prevent back flow of drilling, formation, or other fluid.

For example, in a drill string used for work over of an existing petroleum well a check valve is placed close to the drill bit to prevent back flow of drilling fluid when high pressure is encountered at the bottom of the well. A typical work over drill string, to be run inside existing production tubing, may include, in order from the bottom up, a drill bit, a thirty foot length of tubing, two back pressure valves, e.g. valves according to the invention, in series, a landing nipple (short length of pipe with a seat adapted to engage a ball dropped down the tubing, and up to several thousand feet of tubing.

Another example of a use of such check valves, including valves embodying the invention, is as a safety valve at the top length of drill pipe, added quickly to the drill string if high pressure is encountered. Later if it is desired to release the pressure, a release tool is employed, which is screwed into the top of the valve body to push the ball off its seat.

The invention further relates to a release tool for opening the valve to release pressure.

(b) Point of Departure

Heretofore a known back pressure valve, somewhat as shown in FIG. 1 of the accompanying drawings, included a three piece tubular body 21, 23, 25 with threaded pin and box connections on the ends of each piece whereby the pieces were screwed together and adapted to be connected to the adjacent drill string members. Between the upper piece 21 and middle piece 23 was a replaceable seat ring 25, captured between annular shoulder 27 on middle piece 23 and pin 29 at the lower end of upper piece 21, an O-ring 31 sealing between pin 29 and ring 25.

A cross shaped center support 33 was disposed at the juncture of middle piece 23 and lower piece 25 of the tubular body. Support 33 included a downwardly extending leg 35 received in lower piece 25 and two outwardly extending arms 37, 39 resting on top of threaded pin 41 at the top of lower piece 25. An upwardly extending post 43 completed the center support.

A compression helical spring 45 centered about post 43 at its lower end urged a ball 47 against seat 25. The diameter d of the flow passage through the seat ring 25 was smaller than the diameter D of the flow passage through the upper and lower pieces of the body.

Objects of the Invention Include

1. Increased body strength.
2. Prevention of flow blockage by spring support moving up in the middle piece (spring chamber) of tubular body.
3. Prevention of flow blockage arising by buckling of the spring.
4. Prevention of buckling of spring.
5. Elimination of choke effect of seat ring.

Brief Description of Invention

According to the invention a back pressure valve suitable for 5000 up to 20,000 psi working pressure comprises a two piece body including an upper or inlet tube and a lower or outlet tube screwed together with a two step straight threaded pin and box connection and provided with theaded pin and box connectors at the body ends for making connection with other drill string members. A seat ring having the same inner diameter as the inlet tube and the minimum inner diameter of the outlet tube is captured between a shoulder on the outlet tube and the pin at the lower end of the inlet tube. A spring support is screwed into the lower end of the outlet tube. The spring support includes a tubular lower portion having three slots in is sides leaving three legs supporting a disc at the upper end of the tube. The tube outer diameter is smaller than the inner diameter of the outlet tube leaving a flow passage therebetween having a cross sectional area at least as large as that through the seat ring. A hexagonal tipped center post rises from the upper side of the disc atop the support tube. A short helical compression spring centered about the center post urges a ball against the seat ring. The post extends half the distance between the lower end of the ball and the lower end of the post. When the ball moves down to the limit imposed by the top of the post, the spring is fully compressed about the post.

Advantages of the Invention

Advantages of the invention include:
(1) The equalization of the seat ring inner diameter and the inner diameters of the connector pins provides greater wall thickness for the pins and hence greater strength.
(2) The two step straight threaded connection between the two body parts gives greater strength.
(3) The two part body is simpler and stronger than a three part body.
(4) The fluid path through the body is wholly outside of the spring so buckling of the spring will not block fluid flow.
(5) The spring support is anchored to the body so it will not pop up and block fluid flow.
(6) The spring is so short it does not buckle. The unsupported length, i.e. the part between the top of the center post and the lower end of the ball is less than twice the outer diameter of the spring. The full compressed length of the part of the spring between the lower part of the ball and the top of the support disc is about the same as the length of the center post. (Note that the upper part of the spring serves as a cup to receive the ball and does not partake fully in the spring compression.)
(7) The flow path through the seat ring is as great as the minimum flow paths through the body tubes.
(8) There is no choking of the flow path past the spring support.
(9) The three slots in the support tube is a number that reduces turbulence and hence reduces wear which a swirling abrasive might cause.
(10) The spring support is easily released with a socket wrench engaged with the hex or other non-circular tip on the center post.

BRIEF DESCRIPTION OF THE DRAWINGS

For a detailed description of a preferred embodiment of the invention, reference will now be made to the accompanying drawings wherein FIG. 1, previously referred to, is an axial section through a back pressure valve somewhat in accordance with the prior art.

FIG. 2 is an axial section through a valve embodying the invention; FIG. 2A is a section at plane 2A—2A of FIG. 2;

FIG. 3 is a half section showing an improved form of valve opening tool useful for opening a valve embodying the invention.

FIG. 4 is a top view of the tool shown in FIG. 3.

FIG. 5 is an elevation, partly in section, showing a socket wrench suitable for removal of the spring support of a valve embodying the invention.

Figure 1:
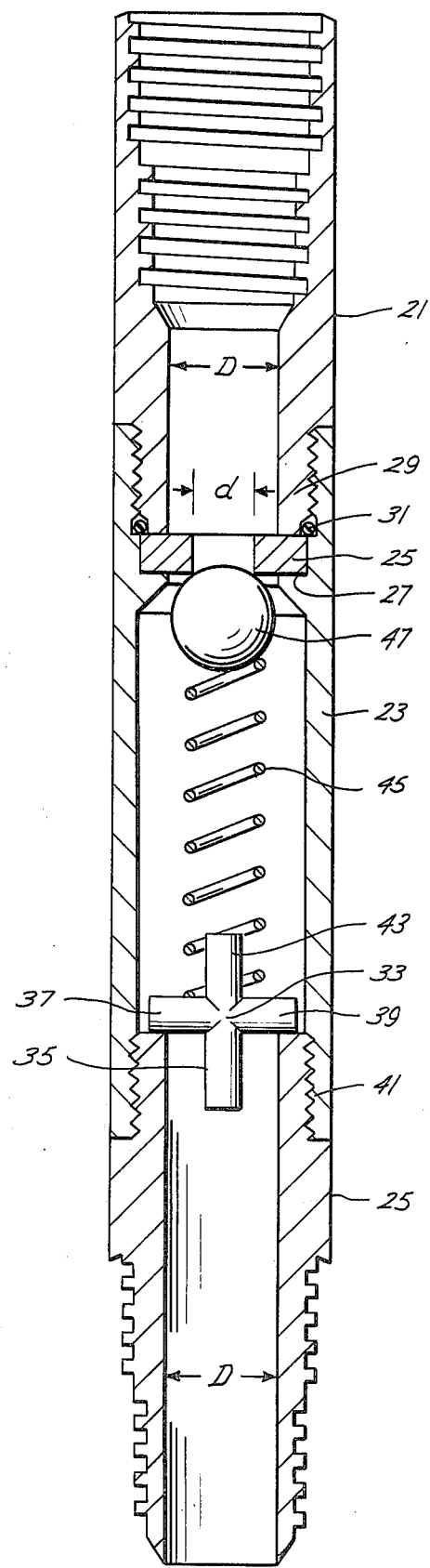

The drawings, except for FIGS. 1 and 5, are to scale, and the conventions of the U.S. Patent and Trademark Office for designation of materials have been employed. Except for the O-ring, the parts are all made of steel.

DESCRIPTION OF PREFERRED EMBODIMENT

Referring now to FIG. 2, there is shown a valve comprising tubular body 101 including upper or inlet tube 103 and lower or outlet tube 105. There is an internally threaded box 107 connector at the upper end of inlet tube 103 and an externally threaded pin connector 109 at the lower end of outlet tube 105. Preferably connectos 107,109 are correlative and of the high pressure Hydril type employing straight threads on two different diameters forming a two step thread on each connector, but whatever connector is required for incorporation in the desired drill string can be provided.

The upper and lower tubes are screwed together, tube 103 being provided at its lower end with an externally threaded pin connector 111 which screws into an interally threaded box connector 113 at the upper end of tube 105. Connectors 111 and 113 are preferably of the high pressure, Hydril, straight threaded, two step type.

Lower tube 105 includes an upwardly facing internal shoulder 115 against which bears a hard steel seat ring 117, held against the shoulder by pin 111. An O-ring seal 119, made of rubber or other oil and water resistant elastomeric material, is compressed between ring 117, lower tube 113, and pin 111.

A valve closure comprises a ball 121 which seats and seals against seat ring 117 and is urged against the ring by the upper end of helical compression spring 123. The spring bears at its lower end against tubular spring support 125 which is closed at its upper end by disc 127. A center pin or post 129 extends upwardly from disc 127 nearly half way into the spring. Spring support 125 is threaded at its lower end with straight threads 131 and is screwed into threaded socket 133 against annular shoulder 135.

There are three slots 137 in tube 125, equiazimuthally spaced apart, as best shown in FIG. 2A, leaving three legs or struts 139 therebetween. The three slots provide fluid passage through the support. Three slots are preferred to some other number of slots such as one, two, four or five, because this number, three, is believed to produce the least turbulence.

Note that the wire diameter w of the helical spring is about the same or only slightly smaller than the coil spacing c, the distance between adjacent turns of the spring. Also note that the length of the center post 129 equals 3 turns I, II, III and that there are three turns IV, V, VI from the top of post to the bottom of ball 121 and that top turn VII forms a cup to receive the ball. Note that the coil inner diameter of the spring is only slightly larger than the outer diameter of hexagonal post 129, the spring making a snug sliding fit with the post. Also note that the distance from the bottom of the ball to the top of the post, is about the same as the length of the post. These dimensions avoid buckling of the spring.

When it is desired to replace the spring support, a socket wrench, such as wrench 141 shown in FIG. 5, may be employed. The hexagonal socket 143 is adapted to engage hexagonal head 145 on the upper end of post 129. By turning handle 147, the support can easily be unscrewed from socket 133.

If the valve is used as safety valve, i.e. a temporary closure at the upper end of a string of tubing, the pressure locked in the tubing can be released by inserting a release tool 149 (see FIGS. 3 and 4) into the tubing and screwing its externally threaded portion 151 into the box at the upper end of the tubing. A stinger rod 153 extends through the length of the tubing into the top of upper tube 103 of the valve and presses down on ball 121 to open the valve. A plurality of paraxial holes 155 in rod 153 allow fluid flow out through the tool to relieve the pressure.

While a preferred embodiment of the invention has been shown and described, modifications thereof can be made by one skilled in the art without departing from the spirit of the invention.

I claim:
1. A valve comprising
  a tubular body having a flow passageway therethrough providing an inlet at one end of the passageway and an outlet at the other end of the passageway,
  an annular seat about the passageway between said inlet and outlet, and providing a flow passage forming part of said passageway,
  a closure ball in said passageway on the outlet side of said seat adapted to engage said seat and block flow through said seat and movable in said passageway between a closed position engaging said seat and thereby blocking flow through said seat and an open position out of engagement with said seat leaving said seat open for flow therethrough,
  a helical spring in said passageway downstream from said ball and seat bearing at one end against said ball urging said ball into closed position, and
  support means in said passageway down stream from said spring and ball and seat and upstream from said outlet secured to said body and providing a support seating for the other end of said spring to take the reaction force thereof,
  said support means including a footing comprising at least one strut connected to said seating and to said body leaving a flowpath past said seating between the exterior of the seating and the interior of the body having a cross-sectional area at least as large as that ot the flow path through said seat passage,
  said spring having a smaller outer diameter than the minimum transverse inner dimension of said passageway leaving a flow path past the spring therearound having a cross-sectional area at least as large as that of said seat,
  said outlet being coaxial with said inlet and spring,
  said support means seating being a fixed imperforate cap closing said other end of said spring against fluid flow therethrough on its way from said inlet to said outlet coaxial with said inlet,
  said flowpath past said seating being entirely between the exterior of the seating and the interior of the body,
  said ball in the open position of the valve being in engagement with only said one end of the spring and providing means to guide flow outwardly of the spring from said inlet to said outlet coaxial therewith, there being an annular flowpath extending axially from the equator of the ball to the spring and extending circumferentially all around the ball between the ball and said body, said annular flow path forming part of said passageway through the valve body, said annular flow path having at least as great a cross-sectional area as the flow path through said seat, said flow passage through the valve having, when the valve is open, a cross-sectional area that everywhere throughout its length is at least equal to that of said flowpath through said seat, exclusive of any area interiorly of the spring, whereby buckling of the spring will not prevent said passageway from having at all places a cross-sectional area at least equal to that of said flowpath through said seat when said valve is open.

2. A valve according to claim 1, said footing comprising a plurality of struts extending axially away from said other end of said spring, said struts being three in number and equally spaced apart about the circumference of said tube leaving therebetween but three ports whereby to minimize turbulent flow therethrough.

3. Valve according to claim 1, said support means including a fixed pin extending from said cap into said other end of said spring to hold said other end of said spring against radial movement within said passageway, said pin having a maximum transverse dimension close to the inner diameter of said spring to make a sliding fit therewith and prevent buckling of the spring over the length of the pin, said ball engaging the end of said pin in said open position of the closure, the distance from said ball to said pin in the closed position of said valve being at least as great as the diameter of said seat, whereby flow between ball and seat is not constricted relative to flow through the seat when the valve is open.

4. Valve according to claim 3, the paraxial distance between turns of said spring in the valve open position being equal to the wire diameter of the spring, said spring having a smaller inner diameter than the outer diameter of the ball, said ball extending into said one end of said spring a certain distance, the length of said spring being equal to twice the length of said pin plus said distance, whereby the length of the valve is kept small.

5. In a valve comprising a tubular body having a flow passageway therethrough providing an inlet at one end of the passageway and an outlet at the other end of the passageway, an annular seat about the passageway between said inlet and outlet, and providing a flow passage forming part of said passageway, a closure ball in said passageway on the outlet side of said seat adapted to engage said seat and block flow through said seat and movable in said passageway between a closed position engaging said seat and thereby blocking flow through said seat and an open position out of engagement with said seat leaving said seat open for flow therethrough, a helical spring in said passageway downstream from said ball and seat bearing at one end against said ball urging said ball into closed position, and support means in said passageway down stream from said spring and ball and seat and upstream from said outlet secured to said body and providing a support seating for the other end of said spring to take the the reaction force thereof, said support means including a footing comprising at least one strut connected to said seating and to said body leaving a flowpath past said seating having a cross-sectional area at least as large as that of the flow path through said seat passage, said spring having a smaller outer diameter than the minimum transverse inner dimention of said passageway leaving a flow path past the spring therearound having a cross-sectional area at least as large as that of said seat, the improvements wherein:

said support means seating is a fixed imperforate cap closing said other end of said spring against fluid flow therethrough on its way to said outlet, said ball in the open position of the valve being in engagement with only said one end of the spring and providing means to guide flow outwardly of the spring, there being an annular flowpath extending axially from the equator of the ball to the spring and extending circumferentially all around the ball between the ball and said body, said annular flow path forming part of said passageway through the valve body, said annular flow path having at least as great a cross-sectional area as the flow path through said seat, said flow passage through the valve having, when the valve is open, a cross-sectional area that everywhere throughout its length is at least equal to that of said flowpath through said seat, exclusive of any area interiorly of the spring, whereby buckling of the spring will not prevent said passageway from having at all places a cross-sectional area at least equal to that of said flowpath through said seat when said valve is open, said footing comprising a slotted tube forming a plurality of struts extending axially away from said other end of said spring, the end of said tube farthest from said spring being exteriorly threaded forming a threaded pin, said body having a threaded box formed about said passageway, said threaded pin at one end of said tube being screwed into said box.

6. Valve according to claim 5, said body being tubular and including two parts threadedly connected together by means of a threaded pin on one part and a threaded socket on the other part with said seat being formed by a ring captured between said threaded pin and an annular shoulder in said other part adjacent the bottom of said socket, the inner diameter of said threaded pin equaling the inner diameter of the seat ring, said body having only two parts, said pin and socket being stepped and having straight threads.

7. Valve according to claim 5, said support means including a pin extending from said cap into said other end of said spring, said pin having a non-circular cross section adapted to receive a wrench to facilitate screwing said threaded pin at the end of said tube into said socket and unscrewing said tube from said socket.

8. Valve according to claim 5,
said struts being three in number and equally spaced apart about the circumference of said tube leaving therebetween but three ports whereby to minimize turbulent flow therethrough.

9. Valve according to claim 5,
said support means including a fixed pin extending from said cap into said other end of said spring to hold said other end of said spring against radial movement within said passageway, said pin having a maximum transverse dimension close to the inner diameter of said spring to make a sliding fit therewith and prevent buckling of the spring over the length of the pin, said ball engaging the end of said pin in said open position of the closure, the distance from said ball to said pin in the closed position of said valve being at least as great as the diameter of said seat, whereby flow between ball and seat is not constricted relative to flow through the seat when the valve is open.

* * * * *

UNITED STATES PATENT AND TRADEMARK OFFICE
CERTIFICATE OF CORRECTION

PATENT NO. : 4,396,035
DATED : AUGUST 2, 1983
INVENTOR(S) : JOHN H. MAPLES

It is certified that error appears in the above—identified patent and that said Letters Patent is hereby corrected as shown below:

Column 1, line 9; change "oil-field" to --oilfield--.

Column 2, line 11; delete "is" and insert --its--.

Column 3, line 24; change "nectos" to --nectors--.

Column 4, line 53; delete "ot" and insert --of--

Column 6, line 16; delete "dimention " and insert --dimensions--.

Signed and Sealed this

Twenty-seventh Day of September 1983

[SEAL]

Attest:

GERALD J. MOSSINGHOFF

Attesting Officer

Commissioner of Patents and Trademarks